(12) United States Patent
Deguchi

(10) Patent No.: US 8,427,930 B1
(45) Date of Patent: Apr. 23, 2013

(54) MEMORY DEVICE

(75) Inventor: Jun Deguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/423,399

(22) Filed: Mar. 19, 2012

(30) Foreign Application Priority Data

Dec. 9, 2011 (JP) ................................. 2011-269671

(51) Int. Cl.
*G11B 9/00* (2006.01)
(52) U.S. Cl.
USPC .......................................................... 369/126
(58) Field of Classification Search .................... 369/126
See application file for complete search history.

(56) References Cited

U.S. PATENT DOCUMENTS

| | | | | |
|---|---|---|---|---|
| 7,142,500 | B2* | 11/2006 | Fasen et al. ................... | 369/126 |
| 7,265,937 | B1* | 9/2007 | Erden et al. ................. | 360/78.14 |
| 7,433,256 | B2* | 10/2008 | De Hoog et al. .............. | 365/215 |
| 7,502,304 | B2* | 3/2009 | Maeda et al. ................. | 369/126 |
| 7,852,739 | B2* | 12/2010 | Koga et al. ................... | 369/126 |
| 7,855,946 | B2* | 12/2010 | Koga et al. ................... | 369/126 |
| 7,961,586 | B2* | 6/2011 | Kubo et al. ................... | 369/126 |
| 8,050,171 | B2* | 11/2011 | Aoki et al. ................... | 369/126 |
| 8,089,833 | B2* | 1/2012 | Cherubini et al. .......... | 369/44.26 |
| 2008/0267022 | A1* | 10/2008 | Bakker ...................... | 369/44.23 |

OTHER PUBLICATIONS

Ju-Il Lee et al., Nanoprecision MEMS Capacitive Sensor for Linear and Rotational Positioning, Journal of Microelectromechanical Systems, vol. 18, No. 3, Jun. 2009, pp. 660-670.

* cited by examiner

*Primary Examiner* — Wayne Young
*Assistant Examiner* — Brenda Bernardi
(74) *Attorney, Agent, or Firm* — Oblon, Spivak, McClelland, Maier & Neustadt, L.L.P.

(57) ABSTRACT

A memory device according to one embodiment includes: a recording array including recording regions, a first positioning region and a second positioning region; a probe array including a plurality of first probes provided oppositely to the recording regions, and a plurality of second probes provided oppositely to the first and second positioning region; an actuator; and a control circuit configured to control an operation of the actuator by using a positioning signal. The first positioning region includes a first positioning pattern. The first positioning pattern has a plurality of first line portions. The second positioning region includes a second positioning pattern. The second positioning pattern has a plurality of second line portions. The control circuit is configured to generate the positioning signal based on whether or not the second probes are in contact with the line portions of the first and second positioning patterns.

20 Claims, 15 Drawing Sheets

First Positioning Region

Second Positioning Region

First Positioning Region

Second Positioning Region

Clock Waveform

Clock Waveform

Clock Waveform

Clock Waveform

Clock Waveform

Clock Waveform

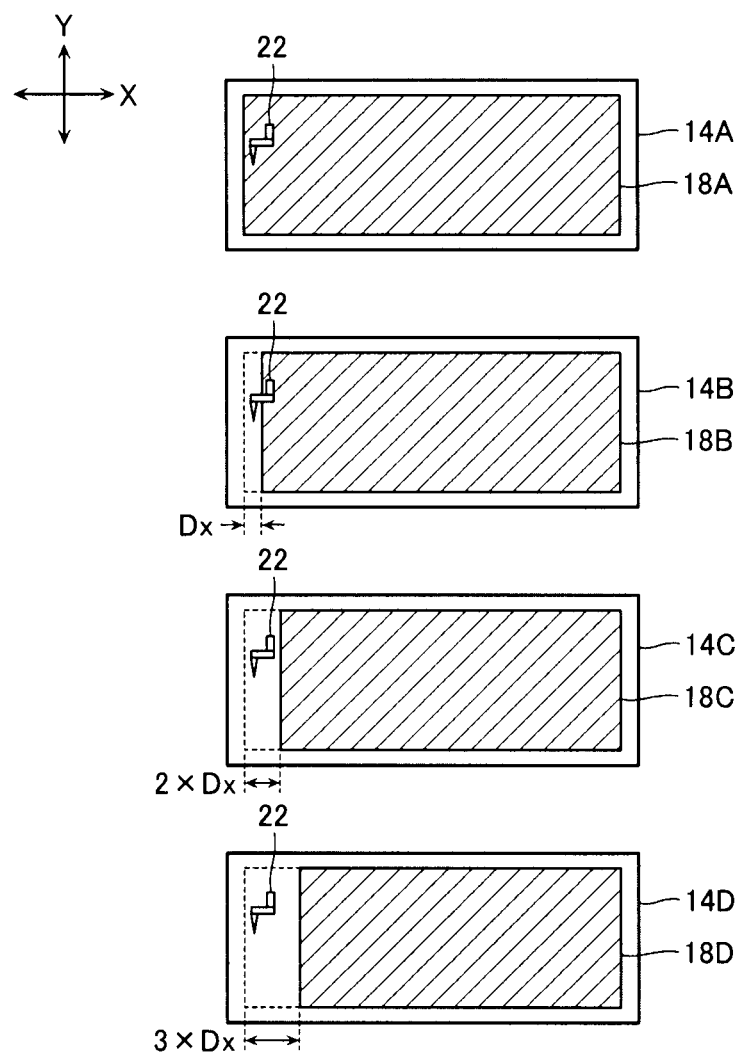

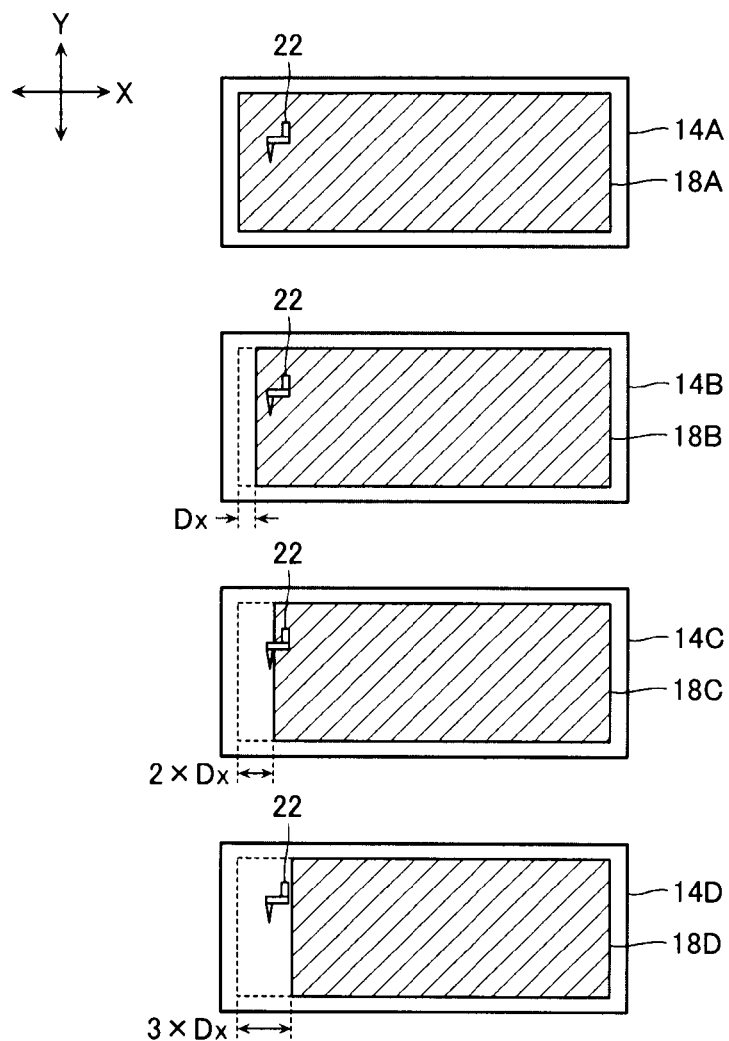

MEMORY DEVICE

CROSS REFERENCE TO RELATED APPLICATIONS

This application is based on and claims the benefit of priority from prior Japanese Patent Application No. 2011-269671, filed on Dec. 9, 2011, the entire contents of which are incorporated herein by reference.

BACKGROUND

1. Field

Embodiments described herein relate to a memory device.

2. Description of the Related Art

Memory devices commonly known to be mounted on electronic devices include memory devices having recoding layers fixed on a drive stage and probes provided oppositely to the recording layers to execute a reading/writing operation to the recording layers. Such memory devices execute reading or writing of data simultaneously by using many probes in order to increase the data writing speed and the data reading speed.

These many probes are arranged on a probe array in a matrix arrangement, for example. The plurality of probes need to be faced precisely oppositely with a plurality of positions (fine recording layers) to be read or written. Hence, the memory device need to appropriately control the probe array mounted with the probes in order to position the probes precisely.

BRIEF DESCRIPTION OF THE DRAWINGS

FIG. 13A is a diagram explaining a positioning operation of the memory device according to the second embodiment.

FIG. 13B is a diagram explaining a positioning operation of the memory device according to the second embodiment.

DETAILED DESCRIPTION

A memory device according to one embodiment includes: a recording array including recording regions each having recording layers for recording data provided thereon in a matrix arrangement, a first positioning region and a second positioning region, the first and second positioning regions each being provided outside the recording regions; a probe array including a plurality of first probes provided oppositely to the recording regions for executing data writing, reading, and erasing to/from the recording layers, and a plurality of second probes provided oppositely to the first positioning region and second positioning region and used for generating a positioning signal representing position information of the recording regions; an actuator configured to change relative positions of the recording array and the probe array with respect to each other; and a control circuit configured to control an operation of the actuator by using the positioning signal and control data writing, reading, and erasing operations to the recording layers. The first positioning region includes a first positioning pattern. The first positioning pattern has a plurality of first line portions extending in a first direction and provided at certain first intervals. The second positioning region includes a second positioning pattern. The second positioning pattern has a plurality of second line portions extending in a second direction intersecting with the first direction and provided at certain second intervals. The control circuit is configured to generate the positioning signal based on whether or not the second probes are in contact with the line portions of the first and second positioning patterns.

A memory device according to some embodiments will be explained below with reference to the drawings. The embodiments below are to be explained by taking, for example, a probe memory device configured to execute data writing, reading, and erasing by probes provided oppositely to recording layers.

First Embodiment

[Entire Configuration]

Figure 1:
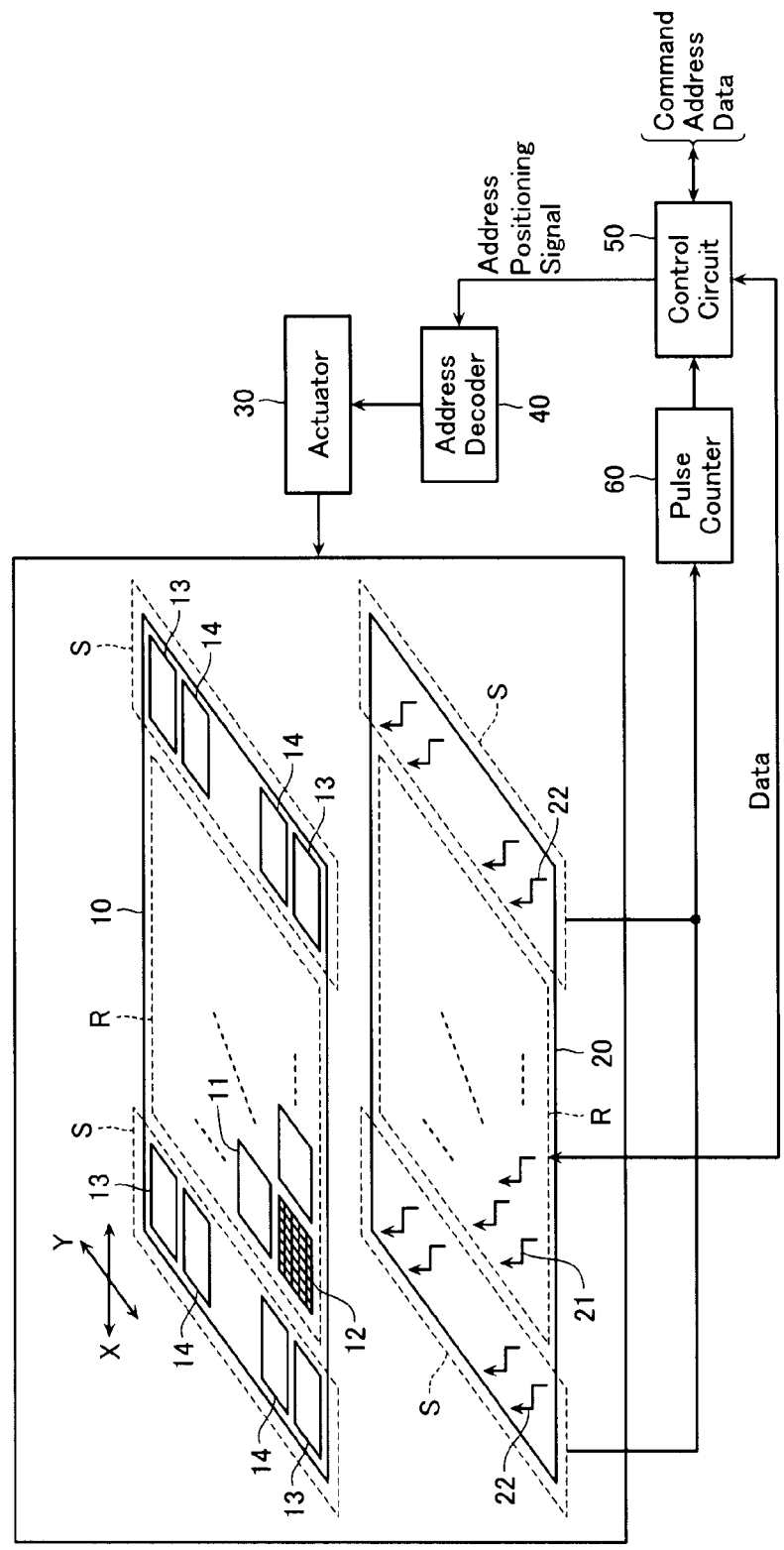
FIG. 1 is a diagram showing a schematic configuration of a memory device according to an embodiment.
Figure 2:
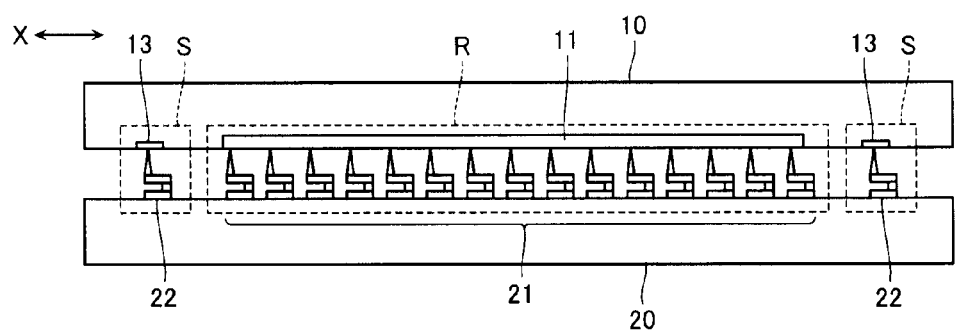
FIG. 2 is a cross-sectional diagram of a recording array and a probe array of a memory device according to an embodiment.

FIG. 1 is a diagram showing a schematic structure of a memory device according to the first embodiment. FIG. 2 is a cross-sectional diagram, taken along an X direction, of a recording array 10 and a probe array 20 used in the memory device.

The probe memory device according to the present embodiment includes: a recording array 10 having recording regions 11 used for storing data; and a probe array 20 provided with probes 21 and 22 used for writing, reading, and erasing data to/from the recording regions 11 and for position control.

The probe memory device also includes an actuator 30, an address decoder 40, a control circuit 50, and a pulse counter 60. The actuator 30 moves the recording array 10 and the probe array 20 with respect to each other, and executes position controls of the recording array 10 and the probe array 20. The actuator 30 may drive the recording array 10 in an X direction and a Y direction, or alternatively may drive the probe array 20 in the X direction and the Y direction. The address decoder 40 controls the operation of the actuator 30 based on an address signal indicating a recording layer 12 to be selected, a positioning signal indicating the position information of the recording regions 11, and so on. The control circuit 50 sends an address signal or a positioning signal to the address decoder 40 and sends read-out data or data to be written to the probe array 20 based on a command, an address, data, and so on supplied from the outside. The control circuit 50 also executes data writing, reading, and erasing operations to a recording layer 12 by using a probe 21, and is configured to be capable of outputting data or the like to the outside.

The recording array 10 and the probe array 20 each have a recording portion R and position sensor portions S located outside the recording portion R. On the recording portion R of the recording array 10, there are formed the recording regions 11 each having recording layers 12 for recording information formed thereon in a matrix arrangement. The recording layers 12 may be formed of a recording element of various types, such as a magnetic body readable and writable by a magnetic energy supplied from the probe 21, a variable resistive element having its resistance value changed by a current, a voltage, or the like supplied from the probe 21. On the recording portion R of the probe array 20, there are a plurality of probes 21 provided oppositely to the recording regions 11 and configured to execute data writing, reading, and erasing to/from the recording layers 12. There are provided such a number of probes 21 as corresponding to the number of recording regions 11. With the recording array 10 driven by the actuator 30, the probes 21 can access a selected recording layer 12 in the recording regions 11. Here, one recording region 11 corresponds to a region within the reach of one probe 21.

First positioning regions 13 and second positioning regions 14 are formed on the position sensor portions S of the recording array 10. The patterns of the first and second positioning regions 13 and 14, and positioning operations using the first and second positioning regions 13 and 14 will be described later. On the position sensor portions S of the probe array 20, there are a plurality of probes 22 provided oppositely to the first positioning regions 13 and the second positioning regions 14 and configured to generate positioning signals indicating the position information of the recording regions 11.

The pulse counter 60 counts the number of pulses acquired by sensing the first and second positioning regions 13 and 14 by using the probes 22, and outputs the count to the control circuit 50. The control circuit 50 generates a positioning signal indicating position information of a recording region 11 based on the signal output from the pulse counter 60, and sends the generated signal to the address decoder 40.

[Positioning Operation]

Figure 3:
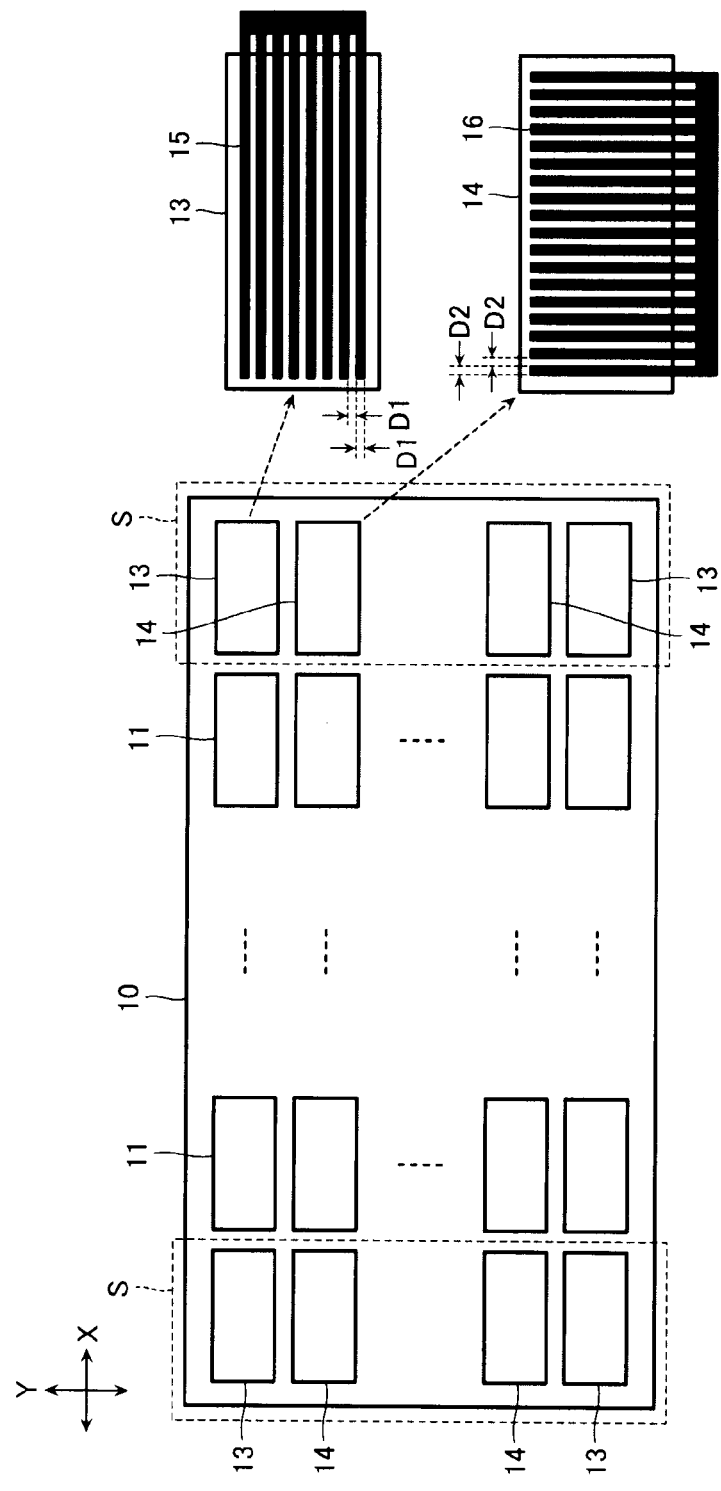
FIG. 3 is a diagram explaining a pattern formed on a positioning region of a memory device according to a first embodiment.

Next, a positioning operation of the memory device according to the present embodiment will be explained. FIG. 3 is a diagram explaining a pattern formed on the positioning regions of the memory device according to the present embodiment. FIG. 3 shows the recording regions 11, the first positioning regions 13, and the second positioning regions 14 formed on the recording array 10.

As shown in FIG. 3, a first positioning region 13 and a second positioning region 14 are formed on each of the four corners of the recording array 10. It is not necessarily indispensable to form a first positioning region 13 and a second positioning region 14 on each of the four corners of the recording array 10. It is only necessary to form at least one first positioning region 13 and at least one second positioning region 14 within the range of the recording array 10.

On the first positioning regions 13, there is formed a first positioning pattern 15 including a plurality of line portions (having a width D1) extending in the X direction and provided at certain intervals of D1. The first positioning pattern 15 is a pattern formed on the recording array 10 from a conductive material. The ends of the line portions of the first positioning pattern 15 are connected commonly and supplied with a grounding voltage Vss. On the second positioning regions 14, there is formed a second positioning pattern 16 including a plurality of line portions (having a width D2) extending in the Y direction and provided at certain intervals of D2. The ends of the line portions of the second positioning pattern 16 are connected commonly and supplied with a grounding voltage Vss. The widths D1 and D2 of the line portions may be the same length or different lengths.

Here, the line portions of the first positioning pattern 15 and of the second positioning pattern 16 need not extend in the perpendicular directions. It is only necessary that the line portions of the first positioning pattern 15 and of the second positioning pattern 16 extend in intersecting directions. The voltage to be supplied to the first positioning pattern 15 and the second positioning pattern 16 needs not be the grounding voltage Vss, but may be a certain voltage.

In the memory device according to the present embodiment, the probes 22 are provided oppositely to the first and second positioning regions 13 and 14. A certain voltage is applied to the probes 22 to allow for detecting whether or not the probes 22 are in contact with the line portions of the first and second positioning patterns 15 and 16. For example, when the probes 22 are in contact with the line portions of the first and second positioning patterns 15 and 16, the probes 22 are discharged, lowering their voltage value to the grounding voltage Vss. On the other hand, when the proves 22 are not in contact with the line portions of the first and second positioning patterns 15 and 16, the probes 22 are not discharged because the material of the recording array 10 has a resistance. In this case, the probes 22 are maintained at the certain voltage value. By detecting the voltage value of the probes 22, it is possible to detect whether or not the probes 22 are in contact with the first and second positioning patterns 15 and 16.

When the probes 22 move over a plurality of lines of the first and second positioning patterns 15 and 16, the voltage values of the probes 22 go up and down to generate a pulse waveform. It is also possible to detect the amount of movement of the probes 22 based on the number of pulses to appear on this pulse waveform and on the widths D1 and D2 of the line portions.

Figure 4:
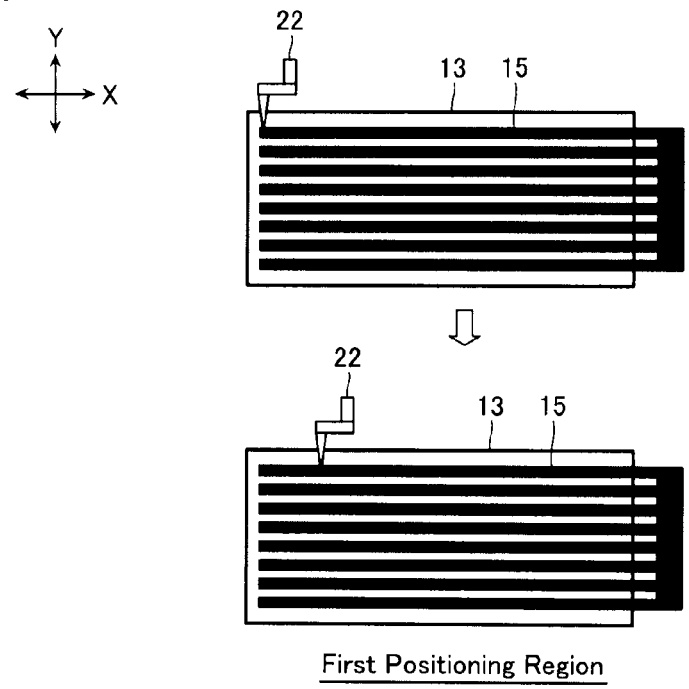
FIG. 4 is a diagram explaining a positioning operation of the memory device according to the first embodiment.
Figure 4:
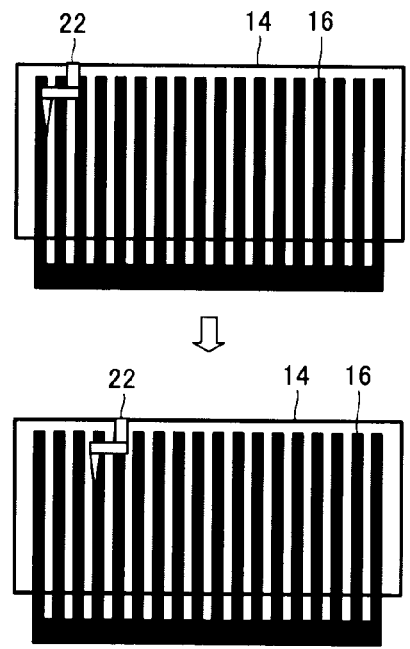
Figure 5:
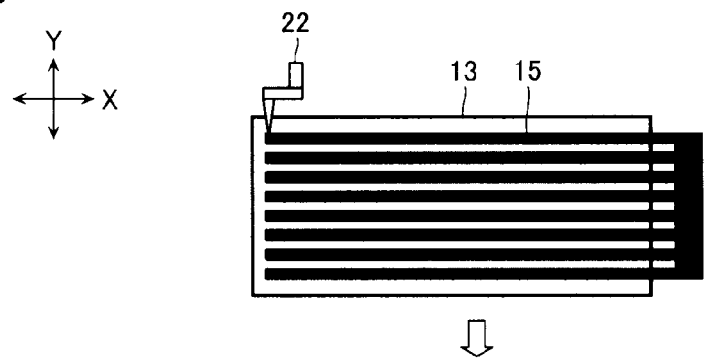
FIG. 5 is a diagram explaining a positioning operation of the memory device according to the first embodiment.
Figure 5:
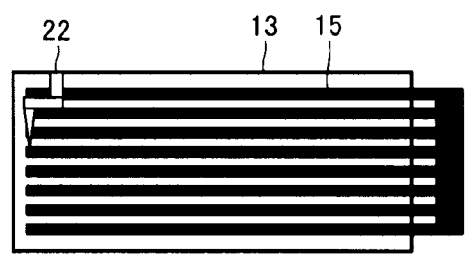
Figure 5:
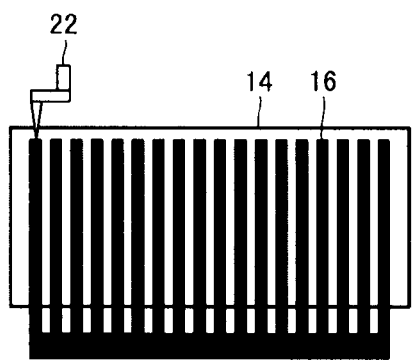
Figure 5:
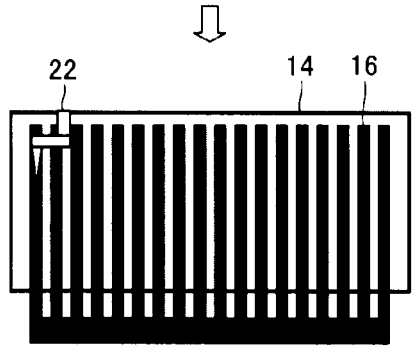
Figure 6:
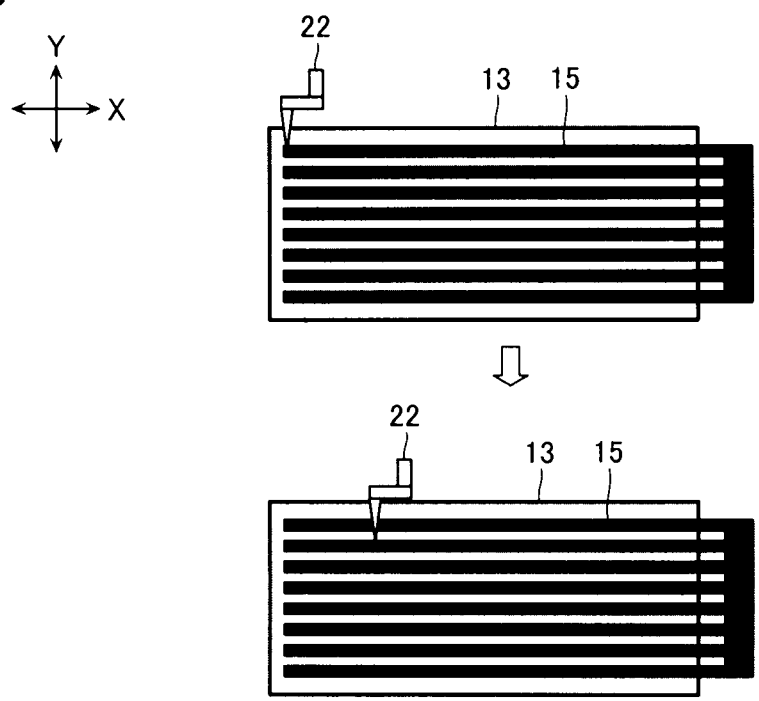
FIG. 6 is a diagram explaining a positioning operation of the memory device according to the first embodiment.

Next, a positioning operation using the first and second positioning patterns 15 and 16 formed on the first and second positioning regions 13 and 14 will be explained with reference to FIG. 4 to FIG. 6. FIG. 4 to FIG. 6 are diagrams explaining a positioning operation of the memory device according to the present embodiment.

FIG. 4 shows an example in which the recording array 10 moves in the X direction. Before starting movement in the X direction, the probe 22 in the first positioning region 13 is on the topmost line of the first positioning pattern 15. Also, before starting movement in the X direction, the probe 22 in the second positioning region 14 is on the leftmost line of the second positioning pattern 16.

When the recording array 10 moves in the X direction, the probe 22 in the first positioning region 13 moves over only the topmost line of the first positioning pattern 15, as shown in FIG. 4. Hence, the voltage of the probe 22 does not change and no pulse waveform is generated, causing no pulses to be sensed by the pulse counter 60. On the other hand, when the recording array 10 moves in the X direction, the probe 22 in the second positioning region 14 moves over a plurality of lines of the second positioning pattern 16. Hence, the voltage of the probe 22 changes and a pulse waveform is generated, causing pulses to be sensed by the pulse counter 60.

By counting the number of pulses to be detected by the probes 22 opposed to the first and second positioning regions 13 and 14 respectively, it is possible to let the control circuit 50 know the amount of movement of the recording array 10 in the X direction. The control circuit 50 can generate a positioning signal for positioning the recording array 10 based on the amount of movement in the X direction, and send it to the address decoder 40.

FIG. 5 shows an example in which the recording array 10 moves in the Y direction. Before starting movement in the Y direction, the probe 22 in the first positioning region 13 is on the topmost line of the first positioning pattern 15. Also, before starting movement in the Y direction, the probe 22 in the second positioning region 14 is on the leftmost line of the second positioning pattern 16.

When the recording array 10 moves in the Y direction, the probe 22 in the first positioning region 13 moves over a plurality of lines of the first positioning pattern 15, as shown in FIG. 5. Hence, the voltage of the probe 22 changes and a pulse waveform is generated, causing pulses to be sensed by the pulse counter 60. On the other hand, when the recording array 10 moves in the Y direction, the probe 22 in the second positioning region 14 moves over only the leftmost line of the second positioning pattern 16. Hence, the voltage of the probe 22 does not change and no pulse waveform is generated, causing no pulses to be sensed by the pulse counter 60.

By counting the number of pulses to be detected by the probes 22 opposed to the first and second positioning regions 13 and 14 respectively, it is possible to let the control circuit 50 know the amount of movement of the recording array 10 in the Y direction. The control circuit 50 can generate a positioning signal for positioning the recording array 10 based on the amount of movement in the Y direction and send it to the address decoder 40.

FIG. 6 shows an example in which the recording array 10 moves in the X direction, getting deviated to the Y direction. Before starting movement in the X direction, the probe 22 in the first positioning region 13 is on the topmost line of the first positioning pattern 15.

Here, when the recording array 10 moves precisely in the X direction as shown in FIG. 4, the probe 22 in the first positioning region 13 moves over the topmost line of the first positioning pattern 15. However, when the recording array 10 gets deviated to the Y direction while moving in the X direction as shown in FIG. 6, the probe 22 in the first positioning region 13 comes off from the line of the first positioning pattern 15. This causes a change in the voltage of the probe 22. Here, if the deviation to the Y direction is small, no pulse waveform might be generated. However, as long as any change is detected in the voltage of the probe 22, the control circuit 50 can detect that a deviation to the Y direction has occurred.

Likewise, when a deviation to the X direction occurs while the recording array 10 is moving in the Y direction, the control circuit 50 can detect the deviation to the X direction. Based on such a deviation to the X direction or the Y direction, the control circuit 50 can generate a positioning signal for enabling the deviation of the recording array 10 to be corrected, and send it to the address decoder 40.

[Recording Layer Selecting Operation]

Next, a recording layer selecting operation of the memory device according to the present embodiment will be explained.

Figure 7:
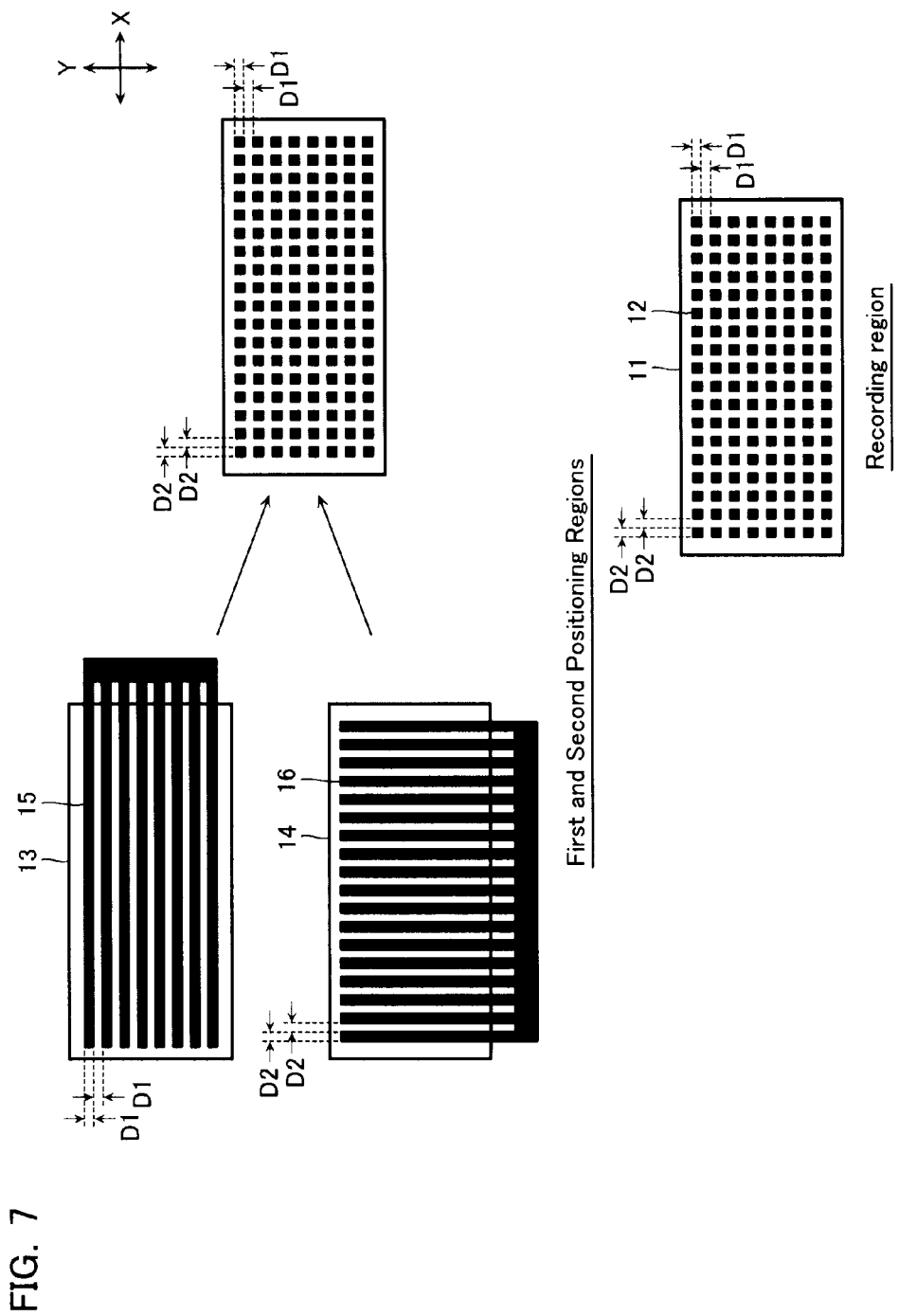
FIG. 7 is a diagram explaining a recording layer selecting operation of the memory device according to the first embodiment.
Figure 8A:
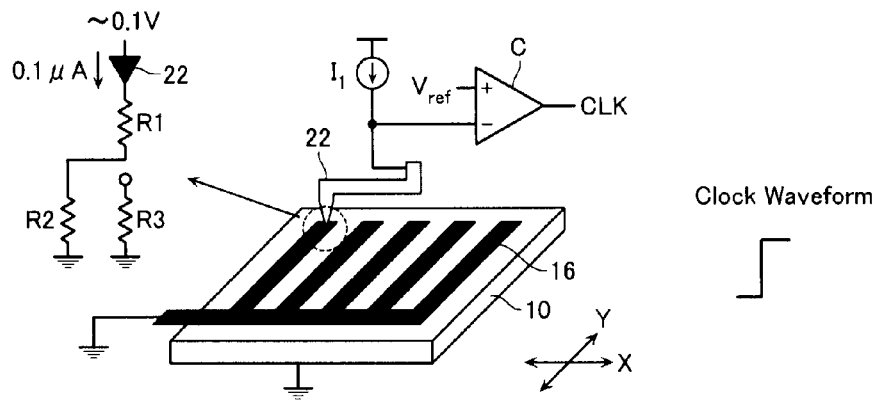
FIG. 8A is a diagram explaining a recording layer selecting operation of the memory device according to the first embodiment.
Figure 8B:
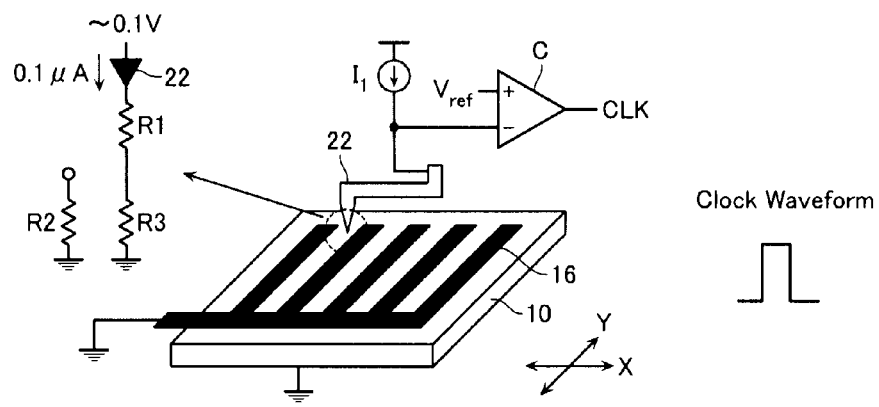
FIG. 8B is a diagram explaining a recording layer selecting operation of the memory device according to the first embodiment.
Figure 8C:
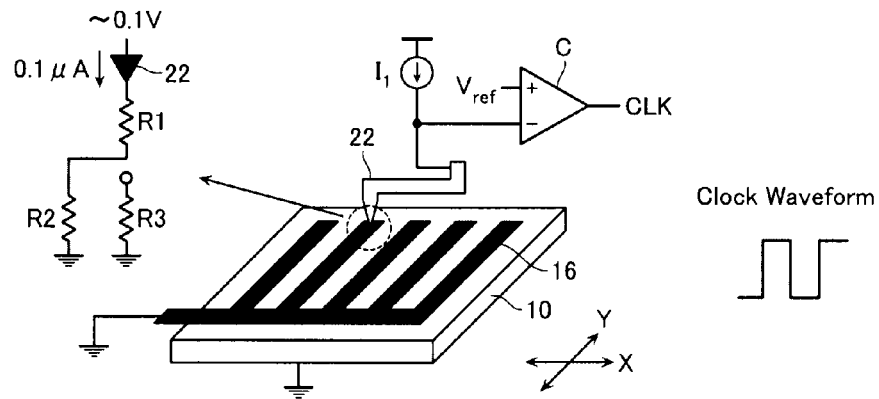
FIG. 8C is a diagram explaining a recording layer selecting operation of the memory device according to the first embodiment.
Figure 9A:
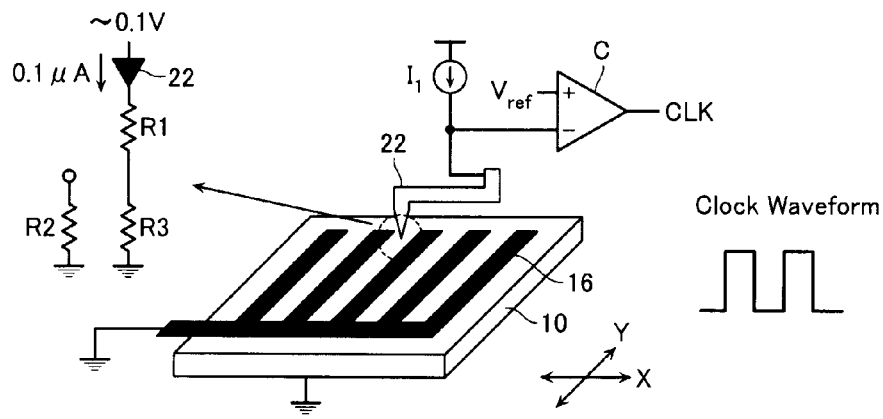
FIG. 9A is a diagram explaining a recording layer selecting operation of the memory device according to the first embodiment.
Figure 9B:
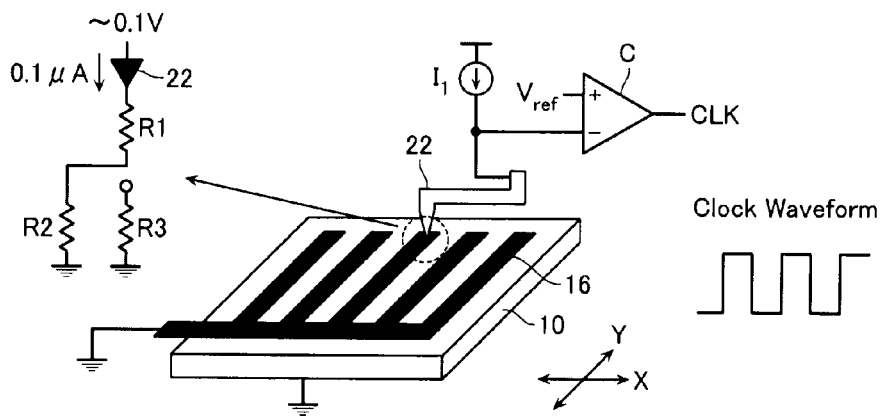
FIG. 9B is a diagram explaining a recording layer selecting operation of the memory device according to the first embodiment.
Figure 9C:
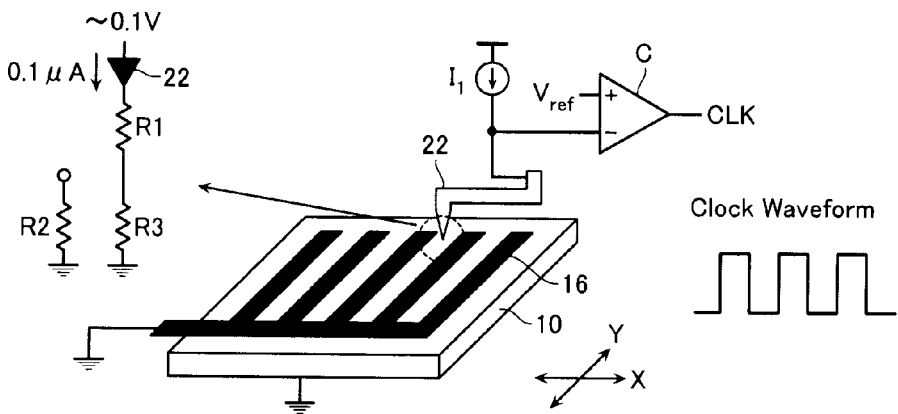
FIG. 9C is a diagram explaining a recording layer selecting operation of the memory device according to the first embodiment.
Figure 10A:
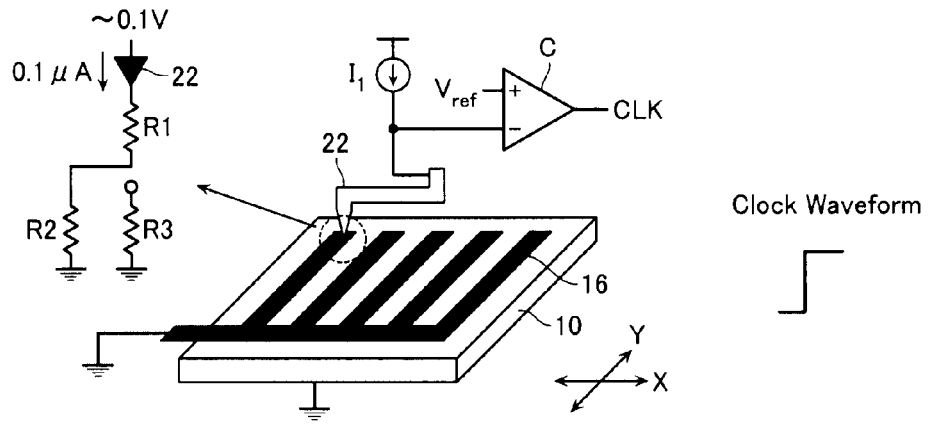
FIG. 10A is a diagram explaining a recording layer selecting operation of the memory device according to the first embodiment.
Figure 10B:
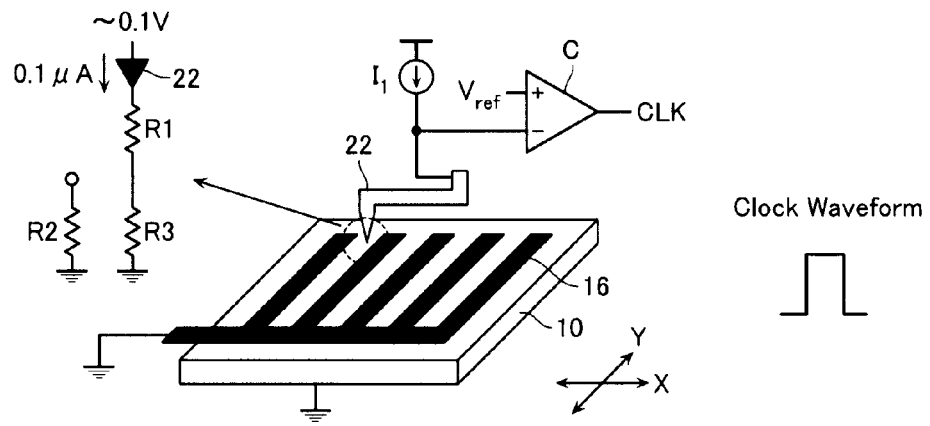
FIG. 10B is a diagram explaining a recording layer selecting operation of the memory device according to the first embodiment.
Figure 10C:
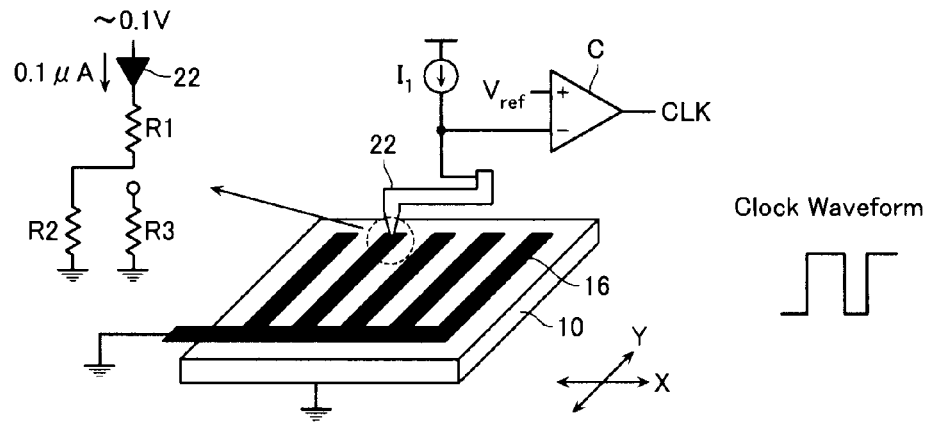
FIG. 10C is a diagram explaining a recording layer selecting operation of the memory device according to the first embodiment.
Figure 11A:
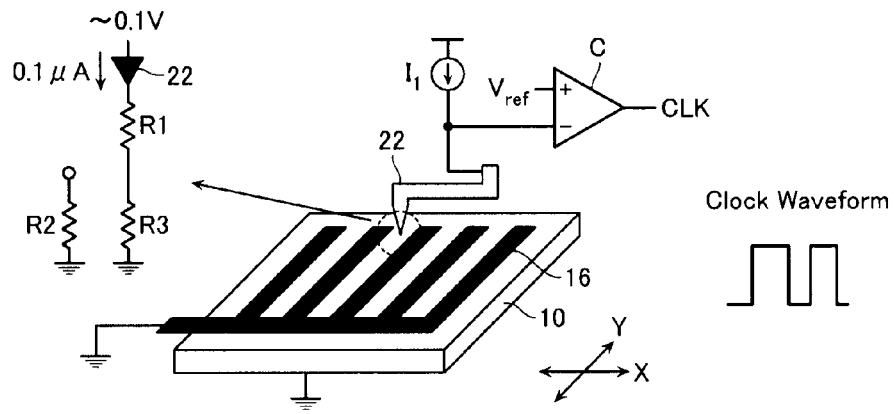
FIG. 11A is a diagram explaining a recording layer selecting operation of the memory device according to the first embodiment.
Figure 11B:
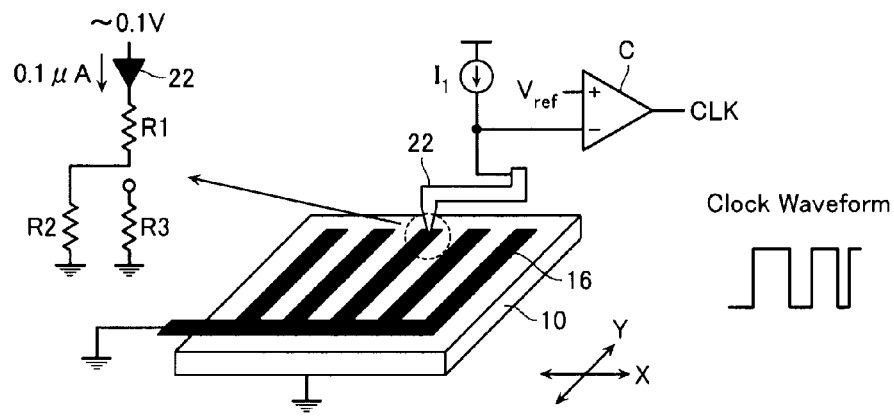
FIG. 11B is a diagram explaining a recording layer selecting operation of the memory device according to the first embodiment.
Figure 11C:
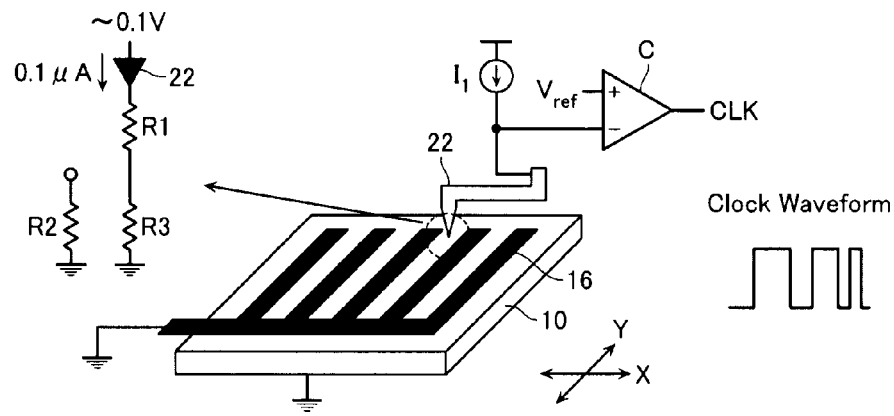
FIG. 11C is a diagram explaining a recording layer selecting operation of the memory device according to the first embodiment.

FIG. 7 is a diagram explaining the recording layer selecting operation of the memory device according to the present embodiment. FIG. 7 is a diagram showing the relationship between the first and second positioning patterns 15 and 16 formed on the first and second positioning regions 13 and 14 and the pattern of the recording layers 12 formed on the recording regions 11.

As shown in FIG. 7, when the first and second positioning patterns 15 and 16 according to the present embodiment are overlaid one upon the other, each of the portions where the line portions overlap forms a rectangular shape having lengths D1 and D2 in the Y direction and X direction respectively. Further, the portions where the line portions overlap are arranged at intervals of D1 and D2 in the Y direction and X direction respectively to form a matrix arrangement.

Here, as shown in FIG. 7, the recording layers 12 formed on the recording region 11 according to the present embodiment are provided to form the same arrangement as the portions where the line portions of the first and second positioning patterns 15 and 16 overlap. The recording layers 12 have a rectangular shape having lengths D1 and D2 in the Y direction and X direction respectively, and are arranged at intervals of D1 and D2 in the Y direction and X direction respectively to form a matrix arrangement.

As shown in FIG. 1 and FIG. 2, the probes 21 opposed to the recording regions 11 and the probes 22 opposed to the first and second positioning regions 13 and 14 are mounted on the same probe array 20, and hence the amount of their movement is linked each other. When the recording layers 12 are in the corresponding arrangement with respect to the first and second positioning patterns 15 and 16 as shown in FIG. 7, by setting the probes 21 and the probes 22 opposed to the respective regions such that they are put on appropriate positions, it is possible to use the first and second positioning patterns 15 and 16 for positioning the probes 21 with respect to the recording layers 12.

For example, when the probes 22 opposed to the first and second positioning regions 13 and 14 are on the line portions of the first and second positioning patterns 15 and 16 respectively, the probes 21 opposed to the recording regions 11 are on the recording layers 12. Further, even when at least either the probes 22 opposed to the first positioning region 13 or the probes 22 opposed to the second positioning region 14 get deviated from the line portions of the first or second positioning patterns 15 or 16, the probes 21 opposed to the recording regions 11 come off from the recording layers 12. In this way, by forming the first and second positioning patterns 15 and 16 and the recording layers 12 so as to have the same width and the same intervals, it is possible to select and locate the recording regions 11 by using the first and second positioning patterns 15 and 16.

Next, an operation of generating a clock signal CLK for executing reading from the recording layers 12 by using the first and second positioning patterns 15 and 16, and a reading operation to the recording layers 12 by using the clock signal CLK will be explained with reference to FIG. 8A to FIG. 11C. FIG. 8A to FIG. 9C are diagrams explaining an operation of generating a clock signal CLK for executing reading from the recording layers 12 by using the second positioning pattern 16.

FIG. 8A to FIG. 9C show, as an example, the second positioning pattern 16 formed on the second positioning region 14, the probe 22 provided oppositely to the second positioning region 14, and a circuit configured to generate a clock signal CLK based on a sensing result from the probe 22. FIG. 8A to FIG. 9C also show an equivalent circuit of a path from the probe 22 to the ground. Here, the circuit configured to generate a clock signal CLK is provided in the control circuit 50, for example. A certain current or voltage is applied to the probe 22 from a constant current circuit. A comparator C is supplied with a reference voltage Vref at its non-inverting input terminal, and with the voltage of the probe 22 at its inverting input terminal. The comparator C compares the voltage of the probe 22 with the reference voltage Vref and outputs a clock signal CLK.

For example, when the probe 22 is in contact with the positioning pattern 16, the voltage of the probe 22 is discharged through the conductive material of the second positioning pattern 16. Here, the resistance value of the contact resistance R between the probe 22 and the second positioning pattern 16 is approximately 1 MΩ. The resistance value R2 of the second positioning pattern 16 is some kΩ. Hence, the voltage of the probe 22 lowers to below the reference voltage Vref. A clock signal CLK to be output from the comparator C at this time is in "H" state.

On the other hand, when the probe 22 is not in contact with the positioning pattern 16, the voltage of the probe 22 is not discharged because the material used for the recording array 10 has a high resistance value. Here, the contact resistance between the probe 22 and the second positioning pattern 16 is approximately 1 MΩ. The resistance value R3 of the material used for the recording array 10 is approximately 10 MΩ. Hence, the voltage of the probe 22 is maintained above the reference voltage Vref. A clock signal CLK to be output from the comparator C at this time is in "L" state.

FIG. 8A to FIG. 9C show an example in which the recording array 10 moves in the X direction at a constant velocity. Before starting the movement in the X direction shown in FIG. 8A, the probe 22 in the second positioning region 14 is on the leftmost line of the second positioning pattern 16.

As shown in FIG. 8A to FIG. 9C, when the recording array 10 moves in the X direction, the probe 22 in the second positioning region 14 moves over a plurality of lines of the second positioning pattern 16. Hence, the voltage of the probe 22 changes and a clock signal CLK is output from the comparator C. The clock signal CLK will form a waveform having a duty ratio and a frequency corresponding to the velocity of the movement in the X direction. When the recording array 10 moves in the X direction at a constant velocity, the pulse width and inter-pulse interval of the clock signal CLK are equal as shown in FIG. 8A to FIG. 9C.

When the first and second positioning patterns 15 and 16 and the recording layers 12 are formed so as to have the same width and the same intervals as described above, it is possible to control the timing of a reading/writing operation to the recording layers 12 by using the clock signal CLK. When the clock signal CLK is in "H" state, the probe 22 is in contact with the second positioning pattern 16, and hence the probe 21 opposed to the recording region 11 is also in contact with a recording layer 12. When the clock signal CLK is in "L" state, the probe 22 is not in contact with the second positioning pattern 16, and hence the probe 21 opposed to the recording region 11 is also not in contact with a recording layer 12. The control circuit 50 can generate a positioning signal for the recording array 10 based on the clock signal CLK and send it to the address decoder 40. Hence, the control circuit 50 can execute an operation of selecting and locating a recording layer 12.

Next, FIG. 10A to FIG. 11C show an example in which the recording array 10 moves in the X direction at a non-constant velocity. In the probe memory device, the recording array 10 and the probe array 20 may move with respect to each other, shaking at a specific frequency. In such a case, the recording array 10 will move over the probe array 20 at a non-constant velocity. Before starting the movement in the X direction shown in FIG. 10A, the probe 22 in the second positioning region 14 is on the leftmost line of the second positioning pattern 16.

As shown in FIG. 10A to FIG. 11C, when the recording array 10 moves in the X direction, the probe 22 in the second positioning region 14 moves over a plurality of lines of the second positioning pattern 16. Hence, the voltage of the probe 22 changes and a clock signal CLK is output from the comparator C. The clock signal CLK will form a pulse waveform having a duty ratio and a frequency corresponding to the velocity of the movement in the X direction. When the recording array 10 moves in the X direction at a non-constant velocity, the pulse width and inter-pulse interval of the clock signal CLK are different from each other, as shown in FIG. 10A to FIG. 11C.

As described above, it is possible to control the timing of a reading/writing operation to a recording layer 12 by referring to the clock signal CLK. Even when the recording array 10 moves at a non-constant velocity, the "H" state and "L" state of the clock signal CLK will indicate whether the probe 21 and the recording layers 12 are in contact or not, as long as the first and second positioning patterns 15 and 16 and the recording layers 12 are formed so as to have the same width and the same intervals. The control circuit 50 can generate a positioning signal for the recording array 10 based on the clock signal CLK and send it to the address decoder 40. Hence, the control circuit 50 can execute an operation of selecting and locating a recording layer 12.

[Effect]

As explained above, it is possible to align the positions of the probes 21 precisely with the recording layers 12 by using the first and second positioning patterns 15 and 16 according to the present embodiment. It is also possible to detect a positional deviation by using the first and second positioning patterns 15 and 16. Here, the region traveled by one probe 22 is very small. Therefore, for example, when the first and second positioning regions 13 and 14 are provided on each of the four corners of the recording array as shown in FIG. 3, it is possible to precisely execute the operation of positioning the probes 21 by providing eight regions to be traveled by the probes 22.

It is also possible to generate a clock signal CLK by using the first and second positioning patterns 15 and 16 to control the timing of a reading/writing operation. In this case, it is possible to control the timing of a reading/writing operation precisely even when the recording array 10 moves at a non-constant velocity.

Second Embodiment

Next, a memory device according to the second embodiment will be explained with reference to FIG. 12 to FIG. 13C. The entire configuration of the memory device according to the present embodiment is the same as the first embodiment, and hence a detailed explanation about it will be omitted. Any components that have the same configuration as the first embodiment will be denoted by the same reference numerals, and a redundant explanation about such components will be omitted.

In the first embodiment, the first and second positioning patterns 15 and 16 formed on the first and second positioning regions 13 and 14 have shapes having line portions extending in the X direction and Y direction respectively. The following second embodiment is different from the first embodiment in that third and fourth positioning patterns 17A to 17D and 18A to 18D are formed instead of the first and second positioning patterns 15 and 16. The third and fourth positioning patterns 17A to 17D and 18A to 18D have rectangular shapes that are located at different positions from one another by a certain interval relative to the probes 22. The probe memory device according to the present embodiment executes an operation of positioning the recording array 10 by using these third and fourth positioning patterns 17A to 17D and 18A to 18D. The operation of positioning the recording array 10 according to the second embodiment will now be explained.

Figure 12:
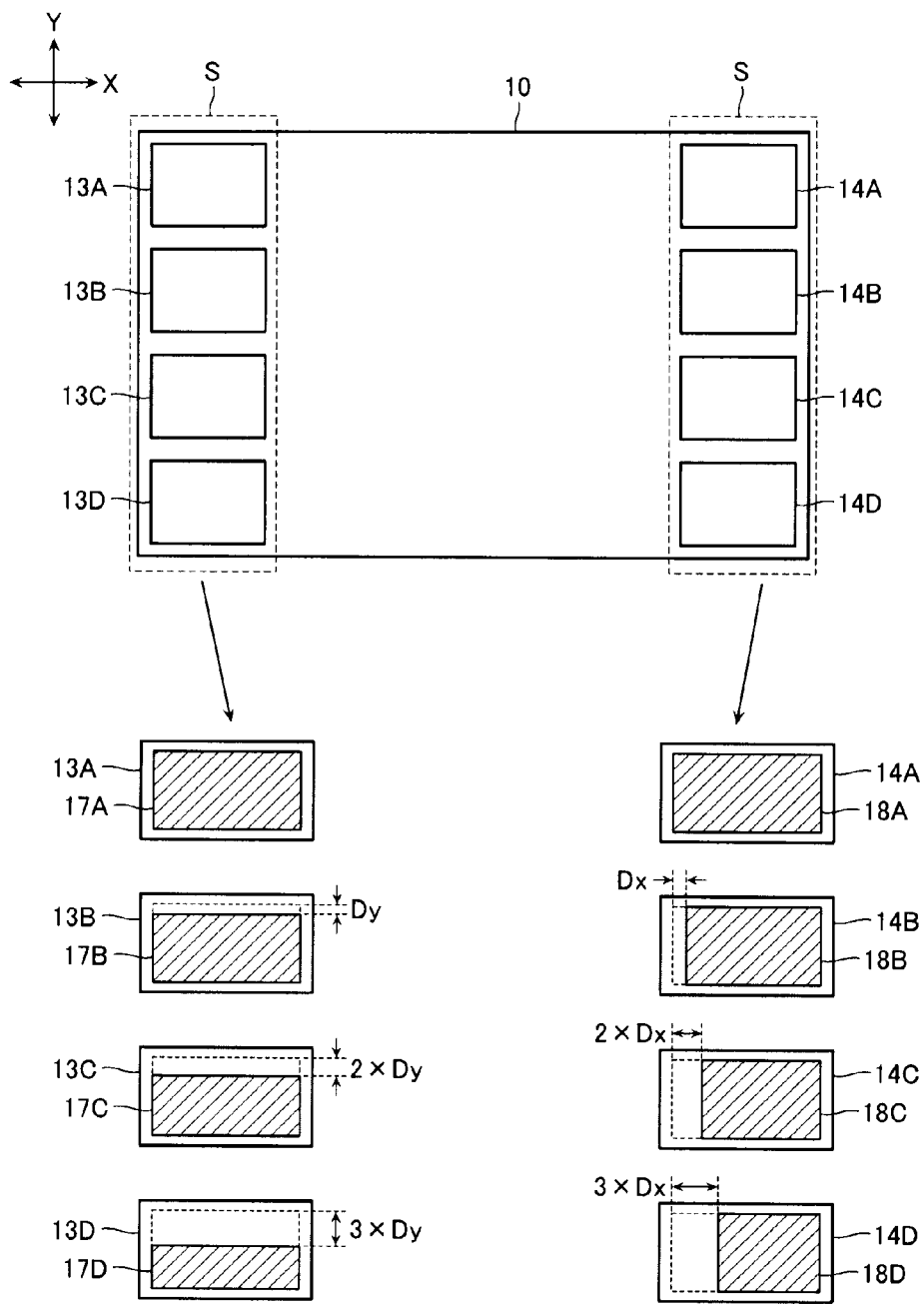
FIG. 12 is a diagram explaining a pattern formed on a positioning region of a memory device according to a second embodiment.

FIG. 12 is a diagram explaining the patterns formed on the positioning regions of the memory device according to the present embodiment. FIG. 12 shows first positioning regions 13A to 13D and second positioning regions 14A to 14D formed outside the recording regions 11.

As shown in FIG. 12, the position sensor portions S of the recording array 10 are each provided with four positioning regions (first positioning regions 13A to 13D and second positioning regions 14A to 14D). The number of first positioning regions 13A to 13D and second positioning regions 14A to 14D is not limited to four, and it is only necessary that a plurality of positioning regions are provided in each portion.

On the first positioning regions 13A to 13D, there are formed the third positioning patterns 17A to 17D that are located at different positions from one another by a certain interval of Dy in the Y direction. The third positioning patterns 17A to 17D are patterns formed on the recording array 10 from a conductive material. A grounding voltage Vss is supplied to the third positioning patterns 17A to 17D. On the second positioning regions 14A to 14D, there are formed the fourth positioning patterns 18A to 18D that are located at different positions from one another by a certain interval of Dx in the X direction. A grounding voltage Vss is supplied to the fourth positioning patterns 18A to 18D.

In the memory device according to the present embodiment, probes 22 are provided oppositely to the first positioning regions 13A to 13D and second positioning regions 14A to 14D respectively. A certain voltage is applied to the probes 22 to allow for detecting whether or not the probes 22 are in contact with the third and fourth positioning patterns 17A to 17D and 18A to 18D. For example, when the probes 22 are in contact with the third and fourth positioning patterns 17A to 17D and 18A to 18D, the probes 22 are discharged, lowering their voltage value to the grounding voltage Vss. On the other hand, when the probes 22 are not in contact with the third and fourth positioning patterns 17A to 17D and 18A to 18D, the probes 22 are not discharged because the material of the recording array 10 has a resistance. In this case, the probes 22 are maintained at the certain voltage value. By detecting the voltage value of the probes 22, it is possible to detect whether or not the probes 22 are in contact with the third and fourth positioning patterns 17A to 17D and 18A to 18D.

Next, a positioning operation using the third and fourth positioning patterns 17A to 17D and 18A to 18D formed on the first and second positioning regions 13A to 13D and 14A to 14D will be explained with reference to FIG. 13A to FIG. 13C. FIG. 13A to FIG. 13C are diagrams explaining a positioning operation of the memory device according to the present embodiment.

FIG. 13A shows an example in which the recording array 10 moves in the X direction. Before starting movement in the X direction, the probe 22 is in contact with only the fourth positioning pattern 18A that is formed the most leftward among the fourth positioning patterns 18A to 18D. The probes 22 are not in contact with the fourth positioning patterns 18B to 18D that are located at different positions from one another by a certain interval of Dx in the X direction.

Figure 13C:
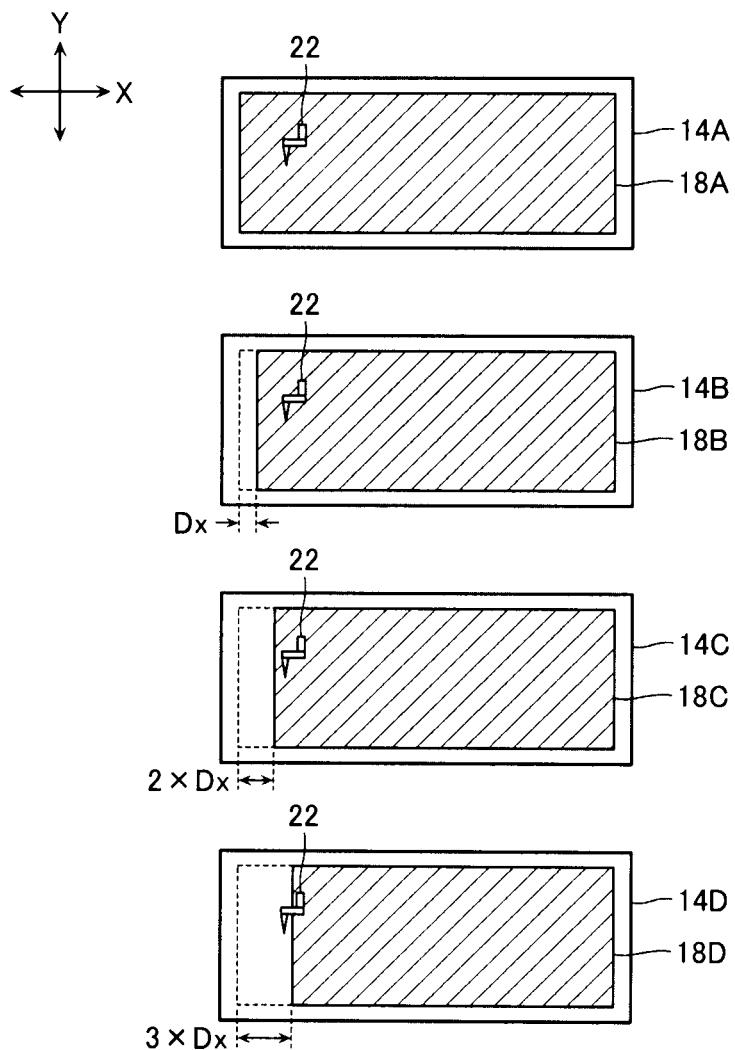
FIG. 13C is a diagram explaining a positioning operation of the memory device according to the second embodiment.

When the recording array 10 moves in the X direction by a distance Dx as shown in FIG. 13B, one of the probes 22 in the second positioning regions 14A to 14D newly comes in contact with the fourth positioning pattern 18B among the fourth positioning patterns 18A to 18D. Likewise, when the recording array 10 moves in the X direction by a distance Dx as shown in FIG. 13C, one of the probes 22 in the second positioning regions 14A to 14D newly comes in contact with the fourth positioning pattern 18C among the fourth positioning patterns 18A to 18D.

By detecting which of the probes 22 opposed to the second positioning regions 14A to 14D is/are in contact with the fourth positioning patterns 18A to 18D, the control circuit 50 can know the amount of movement of the recording array 10 in the X direction. Likewise, by detecting which of the probes 22 opposed to the first positioning regions 13A to 13D is/are in contact with the third positioning patterns 17A to 17D, the control circuit 50 can know the amount of movement of the recording array 10 in the Y direction. The control circuit 50 can generate a positioning signal for the recording array 10 based on the amounts of movement in the X direction and Y direction and send it to the address decoder 40.

[Effect]

As explained above, it is possible to align the positions of the probes 21 precisely with the recording layers 12, also by using the third and fourth positioning patterns 17A to 17D and 18A to 18D according to the present embodiment. Here, since the first and second positioning patterns 15 and 16 according to the first embodiment have line portions, it is impossible to form them with a precision level that is finer than the precision level for manufacturing the line patterns. As compared with this, the third and fourth positioning patterns 17A to 17D and 18A to 18D according to the present embodiment require no line portions, which enables position control to be executed with a minuteness that is finer than the precision level for manufacturing line patterns. It is possible to execute the operation of positioning the probes 21 more accurately by referring to the third and fourth positioning patterns 17A to 17D and 18A to 18D.

Furthermore, like the first embodiment, it is also possible to generate a clock signal CLK by referring to the third and fourth positioning patterns 17A to 17D and 18A to 18D to control the timing of a reading/writing operation. Then, by performing A/D conversion of the state of whether the probes 22 are in or out of contact with the third and fourth positioning patterns 17A to 17D and 18A to 18D, it is possible to acquire the positions of the probes 22 in digital values. This makes it further easier for the control circuit 50 to control the movement of the recording array 10.

[Others]

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, by providing the first and second positioning regions 13 and 14 having the first and second positioning patterns 15 and 16 at each of the four corners of the recording array 10, it is possible not only to perform X direction and Y direction positioning, but also to detect a rotation of the recording array 10. Further, the width and interval of the line portions of the first and second positioning patterns 15 and 16 need not be the same as the width and interval of the recording layers 12. For example, if the width and interval of the line portions of the first and second positioning patterns 15 and 16 are half the width and interval of the recording layers 12, it is possible to align the probes 21 with the positions of the recording layers 12 more precisely. As long as the width and interval of the recording layers 12 are an integral multiple of the width and interval of the line portions of the first and second positioning patterns 15 and 16, it is possible to perform positioning with respect to the recording layers 12.

What is claimed is:

1. A memory device, comprising:
   a recording array including recording regions each having recording layers for recording data provided thereon in a matrix arrangement, a first positioning region and a second positioning region, the first and second positioning regions each being provided outside the recording regions;
   a probe array including a plurality of first probes provided oppositely to the recording regions for executing data writing, reading, and erasing to/from the recording layers, and a plurality of second probes provided oppositely to the first positioning region and second positioning region and used for generating a positioning signal representing position information of the recording regions;
   an actuator configured to change relative positions of the recording array and the probe array with respect to each other; and
   a control circuit configured to control an operation of the actuator by using the positioning signal and control data writing, reading, and erasing operations to the recording layers,
   the first positioning region including a first positioning pattern, the first positioning pattern having a plurality of first line portions extending in a first direction and provided at certain first intervals,
   the second positioning region including a second positioning pattern, the second positioning pattern having a plurality of second line portions extending in a second direction intersecting with the first direction and provided at certain second intervals, and
   the control circuit being configured to generate the positioning signal based on whether or not the second probes are in contact with the line portions of the first and second positioning patterns.

2. The memory device according to claim 1, wherein the first intervals are equal to intervals at which the recording layers provided in the matrix arrangement are arranged in the second direction, and
   the second intervals are equal to intervals at which the recording layers provided in the matrix arrangement are arranged in the first direction.

3. The memory device according to claim 1, wherein the control circuit controls data writing, reading, and erasing to/from the recording layers by using a clock signal generated based on timings at which the second probes pass by the first positioning pattern and the second positioning pattern.

4. The memory device according to claim 1, further comprising a pulse counter configured to count the number of pulses to be acquired based on whether or not the second probes are in contact with the first and second positioning patterns and output a counting result to the control circuit,
   wherein the control circuit generates the positioning signal based on a signal output from the pulse counter.

5. The memory device according to claim 1, wherein the recording array includes a plurality of first positioning regions and a plurality of second positioning regions.

6. The memory device according to claim 5, wherein the recording array includes the first positioning regions and the second positioning regions on its four corners respectively.

7. The memory device according to claim 1, wherein the first positioning pattern and the second positioning pattern are made of a conductive material, and
   the second probes are configured to be applied with a certain voltage and detect, based on a change of the voltage, whether or not they are in contact with the first positioning pattern and the second positioning pattern.

8. The memory device according to claim 1, wherein the first intervals and the second intervals are the same length.

9. The memory device according to claim 1, wherein the first direction and the second direction are directions perpendicular to each other.

10. A memory device, comprising:
    a recording array including recording regions each having recording layers for recording data provided thereon in a matrix arrangement, a plurality of first positioning regions and a plurality of second positioning regions, the first and second positioning regions each being provided outside the recording regions;
    a probe array including a plurality of first probes provided oppositely to the recording regions for executing data writing, reading, and erasing to/from the recording layers, a plurality of second probes provided oppositely to the plurality of first positioning regions and used for generating a positioning signal representing position information of the recording regions, and a plurality of third probes provided oppositely to the plurality of second positioning regions and used for generating the positioning signal;

an actuator configured to change relative positions of the recording array and the probe array with respect to each other; and a control circuit configured to control an operation of the actuator by using the positioning signal and control data writing, reading, and erasing operations to the recording layers, the plurality of first positioning regions including third positioning patterns composed of a plurality of rectangular portions, the rectangular portions being located at different positions from one another by a certain interval relative to the plurality of second probes, the plurality of second positioning regions including fourth positioning patterns composed of a plurality of rectangular portions, the rectangular portions being located at different positions from one another by a certain interval relative to the plurality of third probes, and the control circuit being configured to generate the positioning signal based on whether or not the second and third probes are in contact with the rectangular portions of the third and fourth positioning patterns.

11. The memory device according to claim 10, wherein the plurality of rectangular portions of the third positioning patterns are formed to be located at different positions from one another by the certain interval in a first direction, and the plurality of rectangular portions of the fourth positioning patterns are formed to be located at different positions from one another by the certain interval in a second direction perpendicular to the first direction.

12. The memory device according to claim 10, wherein the third positioning patterns and the fourth positioning patterns are made of a conductive material, and the second and third probes are configured to be applied with certain voltages respectively and detect, based on a change of the voltages, whether or not they are in contact with the third positioning patterns and the fourth positioning patterns.

13. The memory device according to claim 10, wherein the recording array includes the plurality of first positioning regions on its one side and the plurality of second positioning regions on its other side.

14. A memory device, comprising:

a recording array including recording regions each having recording layers for recording data provided thereon in a matrix arrangement, a first positioning region and a second positioning region, the first and second positioning regions each being provided outside the recording regions;

a probe array including a plurality of first probes provided oppositely to the recording regions for executing data writing, reading, and erasing to/from the recording layers, and a plurality of second probes provided oppositely to the first positioning region and the second positioning region and used for generating a positioning signal representing position information of the recording regions;

an actuator configured to change relative positions of the recording array and the probe array with respect to each other; and a control circuit configured to control an operation of the actuator by using the positioning signal and control data writing, reading, and erasing operations to the recording layers, the first positioning region including a first positioning pattern, the first positioning pattern having a plurality of first line portions extending in a first direction, having a first width, and provided at certain first intervals, the second positioning region including a second positioning pattern, the second positioning pattern having a plurality of second line portions extending in a second direction intersecting with the first direction, having a second width, and provided at certain second intervals, the recording layers being provided to have the first width and be at the first intervals in the second direction, and to have the second width and be at the second intervals in the first direction, and the control circuit being configured to control data writing, reading, and erasing to/from the recording layers based on whether or not the second probes are in contact with the line portions of the first and second positioning patterns.

15. The memory device according to claim 14, wherein the recording array includes a plurality of first positioning regions and a plurality of second positioning regions.

16. The memory device according to claim 15, wherein the recording array includes the first positioning regions and the second positioning regions on its four corners respectively.

17. The memory device according to claim 14, wherein the first positioning pattern and the second positioning pattern are made of a conductive material, and the second probes are configured to be applied with a certain voltage and detect, based on a change of the voltage, whether or not they are in contact with the first positioning pattern and the second positioning pattern.

18. The memory device according to claim 14, wherein the first width and the second width are the same length, and the first intervals and the second intervals are the same length.

19. The memory device according to claim 14, wherein the first direction and the second direction are directions perpendicular to each other.

20. The memory device according to claim 14, wherein the probe array is configured to let the first probes be in contact with the recording layers when the second probes are in contact with the line portions of the first and second positioning patterns.

* * * * *